United States Patent
Senou et al.

(10) Patent No.: US 10,145,440 B2
(45) Date of Patent: Dec. 4, 2018

(54) PRESSURE BUFFER DEVICE AND DAMPING FORCE GENERATING MEMBER

(71) Applicant: Showa Corporation, Gyoda (JP)

(72) Inventors: Naoki Senou, Gyoda (JP); Kenichiro Kaneko, Gyoda (JP)

(73) Assignee: SHOWA CORPORATION, Gyoda (JP)

( * ) Notice: Subject to any disclaimer, the term of this patent is extended or adjusted under 35 U.S.C. 154(b) by 54 days.

(21) Appl. No.: 15/118,008

(22) PCT Filed: May 20, 2014

(86) PCT No.: PCT/JP2014/063397
§ 371 (c)(1),
(2) Date: Aug. 10, 2016

(87) PCT Pub. No.: WO2015/177880
PCT Pub. Date: Nov. 26, 2015

(65) Prior Publication Data
US 2017/0016506 A1  Jan. 19, 2017

(51) Int. Cl.
*F16F 9/512* (2006.01)
*F16F 9/32* (2006.01)
(Continued)

(52) U.S. Cl.
CPC ............ *F16F 9/5126* (2013.01); *F16F 9/185* (2013.01); *F16F 9/32* (2013.01); *F16F 9/3214* (2013.01); *F16F 9/3405* (2013.01)

(58) Field of Classification Search
CPC .. F16F 9/5126; F16F 9/185; F16F 9/32; F16F 9/348; F16F 9/3482; F16F 9/3485
See application file for complete search history.

(56) References Cited

U.S. PATENT DOCUMENTS

| 2,360,993 A | * | 10/1944 | Whisler, Jr. ............ F16F 9/348 188/315 |
| 5,964,454 A | | 10/1999 | Völpel |
| 2011/0209957 A1 | | 9/2011 | Ashiba |

FOREIGN PATENT DOCUMENTS

| CN | 2531168 Y | 1/2003 |
| CN | 103161868 A | 6/2013 |

(Continued)

OTHER PUBLICATIONS

International Search Report dated Aug. 5, 2014 for the corresponding PCT Application No. PCT/JP2014/063397.
(Continued)

Primary Examiner — Melanie Torres Williams
(74) Attorney, Agent, or Firm — Leason Ellis LLP

(57) ABSTRACT

A piston section includes a valve seat that forms a first compression-side oil path through which oil flows in accordance with relative movement of a piston rod against a first cylinder, a first compression-side valve section that performs opening-closing of the first compression-side oil path of the valve seat, an inner annular section annularly formed as projecting in the axial direction of the valve seat from the valve seat toward the first compression-side valve, and an extending section that extends in the radial direction of the valve seat from an outer side of the inner annular section to a position at the inner side from a second oil path opening of the first compression-side oil path and projects in the axial direction from the valve seat toward the first compression-side valve section.

11 Claims, 15 Drawing Sheets

(51) Int. Cl.
*F16F 9/18* (2006.01)
*F16F 9/34* (2006.01)

(56) References Cited

FOREIGN PATENT DOCUMENTS

| DE | 2426326 A1 | * | 12/1974 | ............ B60G 13/08 |
|----|----|----|----|----|
| DE | 19846460 A | | 7/1999 | |
| EP | 2614271 A | | 7/2013 | |
| FR | 2767176 A | | 2/1999 | |
| GB | 1550815 A | * | 8/1979 | ............ F16F 9/348 |
| JP | 09-060681 A | | 3/1997 | |
| JP | 2002-130358 A | | 5/2002 | |
| JP | 2010-107003 A | | 5/2010 | |
| JP | 2011-179550 A | | 9/2011 | |
| JP | 2012-229784 A | | 11/2012 | |
| JP | WO 2014156445 A1 | * | 10/2014 | ............ F16F 9/3484 |
| WO | WO-2006/100406 A | | 9/2006 | |
| WO | WO-2012/031805 A | | 3/2012 | |

OTHER PUBLICATIONS

Office Action dated Mar. 7, 2018 for the corresponding Chinese Patent Application No. 201480076134.X.
European Search Report dated Dec. 14, 2017 for the corresponding European Patent Application No. 14892250.3.

* cited by examiner

PRESSURE BUFFER DEVICE AND DAMPING FORCE GENERATING MEMBER

CROSS-REFERENCE TO RELATED PATENT APPLICATIONS

This application is a U.S. National Phase Application under 35 U.S.C. § 371 of International Patent Application No. PCT/JP2014/063397, filed May 20, 2014, which is incorporated by reference in its entirety herein. The International Application was published in Japanese on Nov. 26, 2015 as International Publication No. WO/2015/177880 under PCT Article 21(2).

FIELD OF THE INVENTION

The present invention relates to a pressure buffer device and a damping force generating member.

BACKGROUND OF THE INVENTION

For example, a pressure buffer device disclosed in Patent Document 1 includes a cylinder, a piston, a piston rod, a path through which operational fluid flows with sliding of the piston, and a damping force generating mechanism to generate damping force by controlling flow of the operational fluid as being arranged at a part of the path. Here, the damping force generating mechanism includes a disc supporting section to support a disc as projecting between an outer seat and an inner seat and extending radially between a plurality of openings while projection height thereof is lower than the outer seat and is equal to or higher than the inner seat.

Further, a pressure buffer device disclosed in Patent Document 2 includes a leaf valve to open-close an opening window formed at an output end of a port as being abutted to a boss section and a seat section while a back face on a base end side thereof is supported via an annular base. The annular base is supported by a valve stopper having a tapered face, the gradient of which is raised from the base end side toward an outer end. Further, a plurality of projections projecting to positions at an outer side from an outer end of the annular base as continuing from an end face of the boss section are arranged along a circumferential direction of the boss section.

Patent Document 1: Japanese Patent Application Laid-Open No. 2010-107003
Patent Document 2: Japanese Patent Application Laid-Open No. 2002-130358

SUMMARY OF THE INVENTION

Here, the pressure buffer devices are required to provide previously designed damping force when actually generating damping force. However, in the pressure buffer devices, there is a possibility that variation occurs with generated damping force, for example, when disturbance and stagnation of fluid flow occurs at a flow path forming section or valve operation becomes unstable.

An object of the present invention is to suppress variation of damping force to be generated in a pressure buffer device.

In view of the abovementioned object, the present invention provides a pressure buffer device including a cylinder that stores fluid, a rod that moves in a cylinder axial direction with an end part thereof on one side located in the cylinder and an end part thereof on the other side projected from an opening of the cylinder, and a damping force generating section that generates damping force for relative movement of the rod against the cylinder. Here, the damping force generating section includes a channel forming section that forms a channel through which the fluid flows in accordance with the relative movement of the rod against the cylinder, a valve that performs opening-closing of the channel of the channel forming section, an annular projecting section that is annularly formed as projecting in an axial direction of the channel forming section from the channel forming section toward the valve, and an extending section that extends in a radial direction of the channel forming section from an outer side of the annular projecting section to a position at an inner side from an channel opening of the channel and projects in the axial direction from the channel forming section toward the valve.

According to the above configuration, since the channel opening of the channel and extending section are apart in the radial direction, disturbance and stagnation of flow caused by fluid abutting to the extending section is suppressed. Consequently, variation of damping force to be generated in the pressure buffer device 1 can be reduced.

Further, in view of the abovementioned object, the present invention provides a pressure buffer device including a cylinder that stores fluid, a rod that moves in a cylinder axial direction with an end part thereof on one side located in the cylinder and an end part thereof on the other side projected from an opening of the cylinder, and a damping force generating section that generates damping force for relative movement of the rod against the cylinder. Here, the damping force generating section includes a channel forming section that forms a channel through which the fluid flows in accordance with the relative movement of the rod against the cylinder, a valve that performs opening-closing of the channel of the channel forming section, an annular projecting section that is annularly formed as projecting in an axial direction of the channel forming section from the channel forming section toward the valve, and an extending section that extends in a radial direction of the channel forming section further outward from an outer side of the annular projecting section and projection height thereof from the channel forming section is lower than the annular projecting section.

According to the above configuration, sticking of the valve to the extending section is suppressed and operation of the valve is stabilized. Consequently, variation of damping force to be generated in the pressure buffer device can be suppressed.

Further, in view of the abovementioned object, the present invention provides a damping force generating member including a channel forming section that forms a channel through which fluid flows in accordance with relative movement of a rod against a cylinder, an annular projecting section that is annularly formed as projecting in an axial direction of the channel forming section, and an extending section that extends in a radial direction of the channel forming section from an outer side of the annular projecting section to a position at an inner side from a channel opening of the channel and projects in the axial direction from the channel forming section.

According to the present invention, it is possible to suppress variation of damping force to be generated in a pressure buffer device.

DETAILED DESCRIPTION OF THE INVENTION

In the following, embodiments of the present invention will be described in detail with reference to the attached drawings.

First Embodiment

Figure 1:
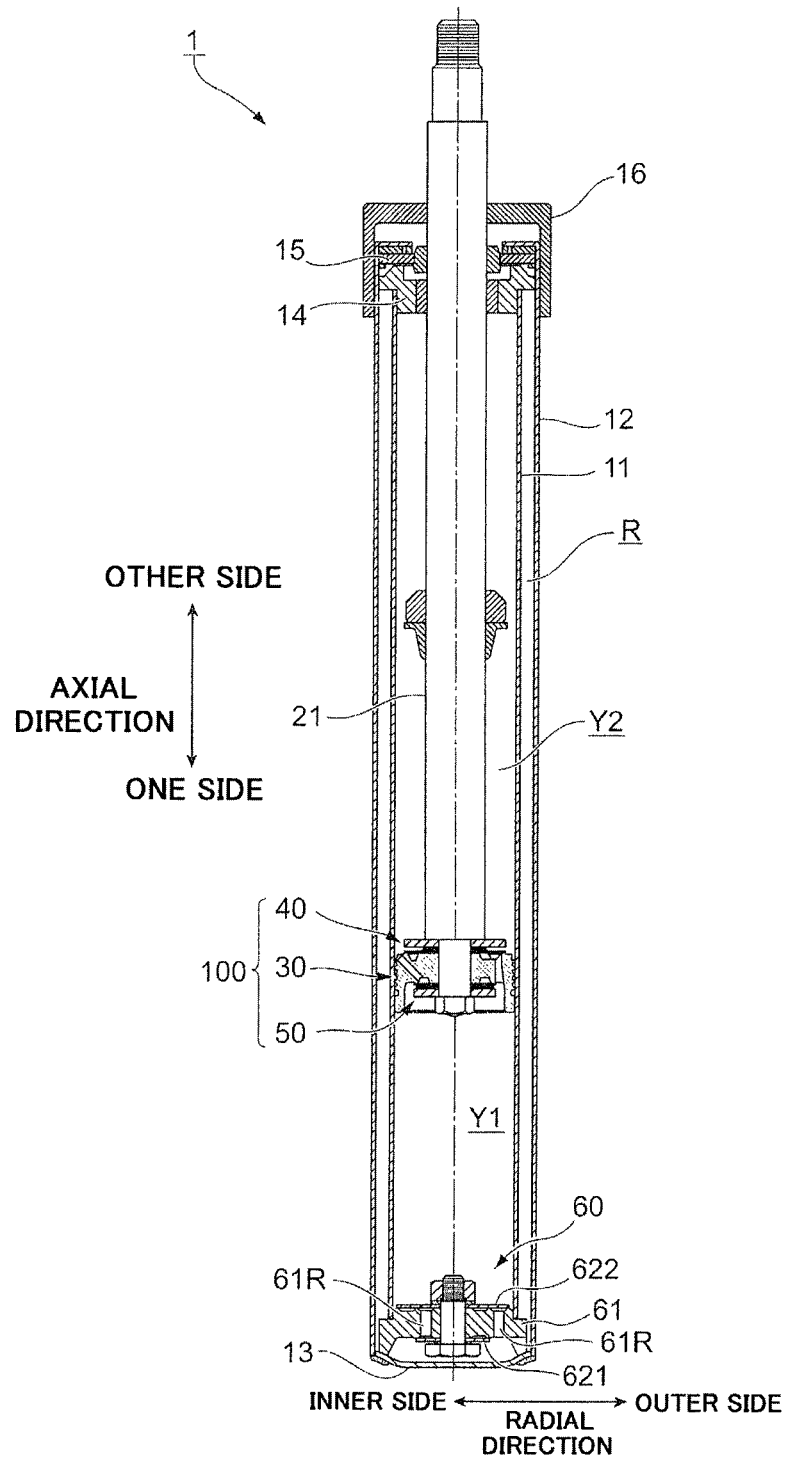
FIG. 1 is an overall structural view of a hydraulic buffer device of a first embodiment.

FIG. 1 is an overall structural view of a hydraulic buffer device 1 of a first embodiment.

In the following description, the longitudinal direction of the hydraulic buffer device 1 illustrated in FIG. 1 is referred to as "an axial direction". In the axial direction, the lower side of the hydraulic buffer device 1 is referred to as "one side" and the upper side of the hydraulic buffer device 1 is referred to as "the other side". The lateral direction of the hydraulic buffer device 1 illustrated in FIG. 1 is referred to as "a radial direction", while a side toward the center axis side and a side away from the center axis are referred to as "an inner side" and "an outer side", respectively.

[Configuration of Hydraulic Buffer Device 1]

First, a configuration of the hydraulic buffer device 1 of the first embodiment is described.

As illustrated in FIG. 1, the hydraulic buffer device 1 of the first embodiment includes a first cylinder 11 that stores oil, a second cylinder 12, a piston rod 21 movable in the axial direction with a part thereof located at the inner side of the first cylinder 11, a piston section 100 fixed to the piston rod 21 and movable in the first cylinder 11, and a bottom valve section 60 arranged at a bottom part on the one side of the first cylinder 11.

[Configuration of First Cylinder 11 and Second Cylinder 12]

As illustrated in FIG. 1, the hydraulic buffer device 1 has a so-called double-cylinder structure having the first cylinder 11 and the second cylinder 12 in order from the inner side to the outer side in the radial direction.

An end part (bottom part) of the first cylinder 11 on the one side is closed by the bottom valve section 60. An end part of the second cylinder 12 on the one side is closed by a bottom lid 13. End parts (upper parts) of the first cylinder 11 and the second cylinder 12 at the other side are closed by a rod guide 14, an oil seal 15, and a cap 16 while the piston rod 21 is capable of passing therethrough. A reservoir chamber R being a cylindrical space is formed between the first cylinder 11 and the second cylinder 12. Oil is stored in the reservoir chamber R and gas is encapsulated in the reservoir chamber R on the other side.

[Configuration of Piston Rod 21]

As illustrated in FIG. 1, the piston rod 21 is arranged as being movable along the axial direction with a part thereof on the one side located at the inner side of the first cylinder 11 and a remaining part thereof on the other side exposed to the outer side of the first cylinder 11. The piston rod 21 is provided with the piston section 100 at an end part thereof on the one side. The piston rod 21 and the piston section 100 move integrally in the axial direction. The piston section 100 is arranged movable in the axial direction along an inner circumferential face of the cylinder.

[Configuration of Piston Section 100]

As illustrated in FIG. 1, the piston section 100 includes a piston body 30 in which a plurality of oil paths (described later) are formed as penetrating in the axial direction, a first compression-side valve section 40 arranged on the other side of the piston body 30, and a first extension-side valve section 50 arranged on the one side of the piston body 30. The piston section 100 partitions a space in the first cylinder 11 into a first oil chamber Y1 being a space on the one side (lower side in FIG. 1) in the axial direction and a second oil chamber Y2 being a space on the other side (upper side in FIG. 1) in the axial direction.

[Configuration of Bottom Valve Section 60]

As illustrated in FIG. 1, the bottom valve section 60 is arranged at an end part of the hydraulic buffer device 1 on the one side and provides partitioning between the reservoir chamber R and the first oil chamber Y1. The bottom valve section 60 includes a bottom piston body 61 in which a plurality of oil paths 61R penetrating in the axial direction are formed, a second extension-side valve section 622 arranged at the bottom piston body 61 on the other side (first oil path Y1 side), and a second compression-side valve section 621 arranged at the bottom piston body 61 on the one side (reservoir chamber R side).

Next, the piston body 30, the first compression-side valve section 40, and the first extension-side valve section 50 of the piston section 100 will be described in detail.

FIG. 2 illustrates the piston body 30 of the first embodiment.

Figure 2A:
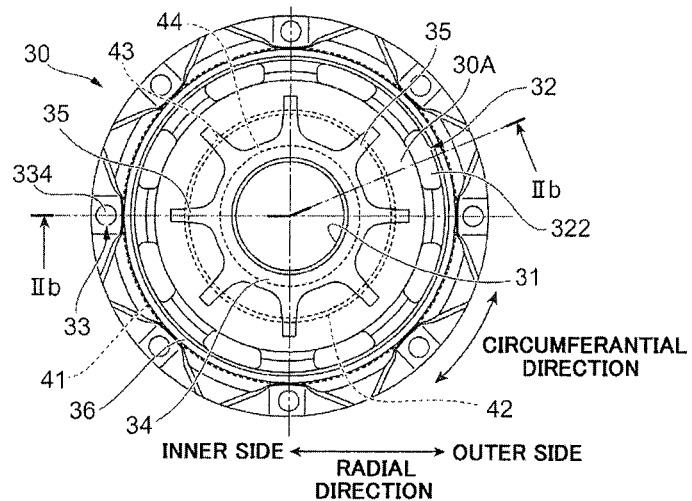
FIGS. 2A to 2C are views illustrating a piston body of the first embodiment.
Figure 2B:
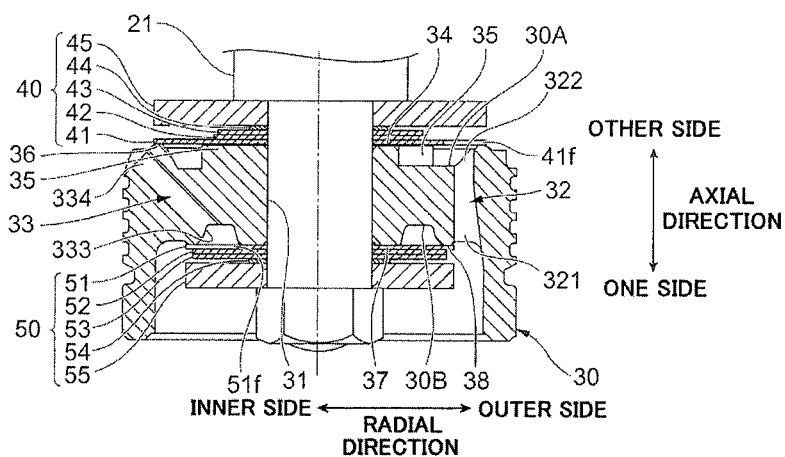
Figure 2C:
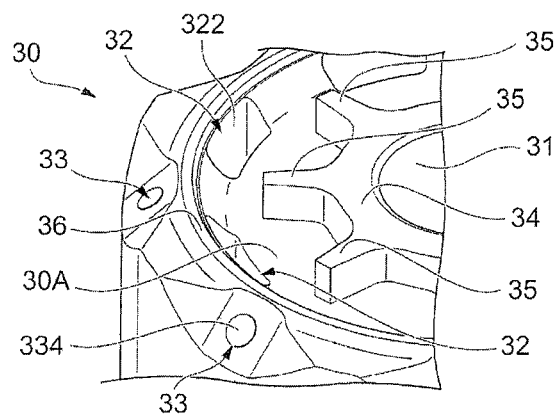

FIG. 2A is a top view of the piston body 30 viewing from the other side, FIG. 2B is a sectional view at IIb-IIb of the piston body 30 illustrated in FIG. 2A, and FIG. 2C is a partial perspective view of the piston body 30 viewing from the other side. FIG. 2B illustrates the piston rod 21, the first compression-side valve section 40, and the first extension-side valve section 50 as well.

As illustrated in FIGS. 1 and 2, the hydraulic buffer device 1 (a pressure buffer device) includes the first cylinder 11 (a cylinder) that stores oil (fluid), the piston rod 21 (rod) that moves in the axial direction of the cylinder with an end part thereof on the one side located in the first cylinder 11 and an end part thereof on the other side projected from an opening of the first cylinder 11, and the piston section 100 (damping force generating section, damping force generating member) that generates damping force for relative movement of the piston rod 21 against the first cylinder 11.

The piston section 100 includes the piston body 30 (channel forming section) that forms a first compression-side oil path 32 (channel) through which oil flows in accordance with relative movement of the piston rod 21 against the first cylinder 11, the first compression-side valve section 40 (valve) that performs opening-closing of the first compression-side oil path 32 of the piston body 30, an inner annular section 34 (annular projecting section) annularly formed as projecting in the axial direction of the piston body 30 from the piston body 30 toward the first compression-side valve section 40, and an extending section 35 that extends in the radial direction of the piston body 30 from an outer side of the inner annular section 34 to a position at the inner side from a second oil path opening 322 of the first compression-side oil path 32 and projects in the axial direction from the piston body 30 toward the first compression-side valve section 40.

In the following, each structural section thereof will be described in detail.

[Configuration of Piston Body 30]

As illustrated in FIGS. 2A and 2B, the piston body 30 includes a through-hole 31 extending in the axial direction, the first compression-side oil path 32 and a first extension-side oil path 33 formed in the piston body 30, the inner annular section 34 arranged on the other side, the extending section 35 arranged on the other side at the outer side of the inner annular section 34 in the radial direction, and an outer annular section 36 arranged on the other side at the outer side of the extending section 35 in the radial direction.

Further, as illustrated in FIG. 2B, the piston body 30 includes an one-side inner annular section 37 arranged at the one side and an one-side outer annular section 38 arranged on the one side at the outer side of the one-side inner annular section 37 in the radial direction.

The through-hole 31 is an approximately cylindrical hole as illustrated in FIGS. 2A to 2C and the piston rod 21 is inserted thereto as illustrated in FIG. 2B.

As illustrated in FIG. 2B, the first compression-side oil path 32 includes a first oil path opening 321 that opens toward the first oil chamber Y1 (see FIG. 1) on the one side and the second oil path opening 322 that opens toward the second oil chamber Y2 (see FIG. 1) on the other side. In the present embodiment, the first compression-side oil path 32 enables oil to flow between the first oil chamber Y1 and the second oil chamber Y2 during a later-mentioned compression stroke. The first compression-side oil path 32 is arranged at a plurality of positions (eight positions in the present embodiment) at approximately even intervals in the circumferential direction as illustrated in FIG. 2A.

Each of the second oil path openings 322 is formed into an approximately rectangular shape as illustrated in FIG. 2A. Each of the second oil path openings 322 is arranged at the outer side of the extending section 35 in the radial direction not between the two extending sections 35 adjacent in the circumferential direction.

The first extension-side oil path 33 includes a third oil path opening 333 that opens toward the first oil chamber Y1 (see FIG. 1) on the one side and a fourth oil path opening 334 that opens toward the second oil chamber Y2 (see FIG. 1) on the other side. In the present embodiment, the first extension-side oil path 33 enables oil to flow between the second oil chamber Y2 and the first oil chamber Y1 during a later-mentioned extension stroke. The first extension-side oil path 33 is arranged at a plurality of positions (eight positions in the present embodiment) at approximately even intervals in the circumferential direction as illustrated in FIG. 2A.

Each of the fourth oil path openings 334 is formed into an approximately circular shape as illustrated in FIG. 2A. Each of the fourth oil path openings 334 is arranged at the outer side of the second oil path opening 322 of the first compression-side oil path 32 in the radial direction.

As illustrated in FIG. 2A, the inner annular section 34 is formed into an approximately annular shape at the outer circumference of the through-hole 31. As illustrated in FIG. 2B, the inner annular section 34 is projected in the axial direction from an end face 30A of the piston body 30 on the other side toward the first compression-side valve section 40. In the present embodiment, projection height of the inner annular section 34 is formed as being the same as that of the outer annular section 36.

As illustrated in FIG. 2A, the extending section 35 is arranged as extending outward in the radial direction at the outer side of the inner annular section 34. A plurality (eight in the present embodiment) of the extending sections 35 are arranged in the circumferential direction. An outer end part of the extending section 35 in the radial direction is formed into an approximately rectangular shape having corners as illustrated in FIG. 2A. As illustrated in FIGS. 2B and 2C, an outer shape of a side portion of the extending section 35 is formed evenly from the other side to the one side. That is, the extending section 35 is formed approximately upright from the end face 30A. The extending section 35 is arranged as extending in the radial direction to a position at the inner side from the second oil path opening 322. Further, the extending sections 35 and the second oil path openings 322 are arranged alternately in the circumferential direction.

That is, each of the extending sections 35 is not formed in a space between the two second oil path openings 322 adjacent in the circumferential direction. Here, in the present embodiment, the space between the adjacent two second oil path openings 322 represents a region surrounded by a radius obtained by connecting innermost circumferential portions of the respective second oil path openings 322 and a radius obtained by connecting outermost circumferential portions thereof. In the first embodiment, arranged as extending to a position at the inner side from the second oil path openings 322, the extending sections 35 are not arranged in the region surrounded by the radius obtained by connecting the innermost circumferential portions of the respective second oil path openings 322 and the radius obtained by connecting the outermost circumferential portions thereof.

The extending section 35 is projected in the axial direction toward the first compression-side valve section 40. In the present embodiment, projection height of the extending section 35 in the axial direction of the piston body 30 is formed as being the same as that of the inner annular section 34. Accordingly, in the present embodiment, the inner annular section 34 and the extending section 35 are integrally formed as illustrated in FIGS. 2A to 2C.

Here, it is also possible that the projection height of the extending section 35 in the axial direction of the piston body 30 is formed as being higher than that of the inner annular section 34.

As illustrated in FIG. 2A, the outer annular section 36 is formed into an approximately annular shape. The outer annular section 36 is arranged between the second oil path opening 322 of the first compression-side oil path 32 and the fourth oil path opening 334 of the first extension-side oil path 33 in the radial direction. As illustrated in FIG. 2B, the outer annular section 36 is projected in the axial direction of the piston body 30 from the end face 30A on the other side toward the first compression-side valve section 40. Here, the outer annular section 36 is formed so that projection height thereof is the same as that of the inner annular section 34.

The one-side inner annular section 37 is formed into an approximately annular shape at the outer circumference of the through-hole 31. As illustrated in FIG. 2B, the one-side inner annular section 37 is projected in the axial direction of the piston body 30 from an end face 30B on the one side toward the first extension-side valve section 50. In the present embodiment, projection height of the one-side inner annular section 37 is formed as being the same as that of the one-side outer annular section 38.

The one-side outer annular section 38 is formed into an annular shape. The one-side outer annular section 38 is arranged between the first oil path opening 321 of the first compression-side oil path 32 and the third oil path opening 333 of the first extension-side oil path 33 in the radial direction. As illustrated in FIG. 2B, the one-side outer annular section 38 is projected in the axial direction of the piston body 30 from the end face 30B on the one side toward the first extension-side valve section 50. Here, projection height of the one-side outer annular section 38 is formed as being the same as that of the one-side inner annular section 37.

[First Compression-Side Valve Section 40]

As illustrated in FIG. 2B, the first compression-side valve section 40 includes a compression-side first valve 41 arranged as being closest to the one side, a compression-side second valve 42 arranged on the other side of the compression-side first valve 41, a compression-side third valve 43 arranged on the other side of the compression-side second valve 42, an annular base 44 arranged on the other side of the compression-side third valve 43, and a valve stopper 45 arranged on the other side of the annular base 44.

The compression-side first valve 41, the compression-side second valve 42, the compression-side third valve 43, and the annular base 44 are disc-like metal plates each having an opening, at the center thereof, through which the piston rod 21 passes. In the present embodiment, the compression-side first valve 41, the compression-side second valve 42, the compression-side third valve 43, and the annular base 44 have approximately the same thickness.

As illustrated in FIG. 2B, the compression-side first valve 41 is formed to have an outer diameter being larger than that of the outer annular section 36. The compression-side first valve 41 covers the second oil path opening 322 of the first compression-side oil path 32 and continuously opens the fourth oil path opening 334 of the first extension-side oil path 33. The compression-side first valve 41 is provided with a plurality of orifices 41f (also see FIG. 4 described later) arranged by forming cutouts at the compression-side first valve 41 from the outer side to the inner side thereof in the radial direction. The orifices 41f enable oil to flow even when the compression-side first valve 41 is in a state of not being deformed, as described later.

The compression-side second valve 42 is formed so that the outer diameter thereof positions above the extending section 35. In the present embodiment, positioning of the outer diameter of the compression-side second valve 42 above the extending section 35 represents that the outer diameter of the compression-side second valve 42 positions in a region between the inner side and the outer side of the extending section 35 in the radial direction.

The compression-side third valve 43 is formed so that the outer diameter thereof positions above the extending section 35. The annular base 44 is formed so that the outer diameter thereof is smaller than that of the inner annular section 34.

The valve stopper 45 is a disc-like member having an opening, at the center thereof, through which the piston rod 21 passes. The valve stopper 45 is formed so that the outer diameter thereof is approximately the same as that of the compression-side first valve 41. As illustrated in FIG. 2B, a face of the valve stopper 45 facing to the compression-side first valve 41 is formed approximately perpendicular to the axial direction as being into an approximately planar shape, a gradient of which being constant in the radial direction from the center side toward the outer side. The valve stopper 45 prevents the compression-side first valve 41, the compression-side second valve 42, and the compression-side third valve 43, when deformed, from being deformed to the other side over the valve stopper 45.

Here, it is also possible that the valve stopper 45 has a tapered face, the gradient of which is raised from the center toward the outer side, that is, from a distal end side toward an outer end side.

[First Extension-Side Valve Section 50]

The first extension-side valve section 50 includes an extension-side first valve 51 arranged as being closest to the other side, an extension-side second valve 52 arranged on the one side of the extension-side first valve 51, an extension-side third valve 53 arranged on the one side of the extension-side second valve 52, an annular base 54 arranged on the one side of the extension-side third valve 53, and a valve stopper 55 arranged on the one side of the annular base 54.

The extension-side first valve 51, the extension-side second valve 52, the extension-side third valve 53, and the annular base 54 are disc-like metal plates each having an opening, at the center thereof, through which the piston rod 21 passes. In the present embodiment, the extension-side first valve 51, the extension-side second valve 52, the extension-side third valve 53, and the annular base 54 have approximately the same thickness.

As illustrated in FIG. 2B, the extension-side first valve 51 is formed to have an outer diameter being larger than that of the one-side outer annular section 38. The extension-side first valve 51 covers the third oil path opening 333 of the first extension-side oil path 33 and continuously opens the first oil path opening 321 of the first compression-side oil path 32. The extension-side first valve 51 is provided with a plurality of orifices 51f arranged by forming cutouts at the extension-side first valve 51 from the outer side to the inner side thereof in the radial direction. As described later, the orifices 51f enable oil to flow even when the extension-side first valve 51 is in a state of not being deformed.

The extension-side second valve 52 is formed so that the outer diameter thereof positions above the one-side outer annular section 38. The extension-side third valve 53 is formed so that the outer diameter thereof positions above the one-side outer annular section 38. The annular base 54 is formed so that the outer diameter thereof is smaller than that of the one-side inner annular section 37.

The valve stopper 55 is a disc-liker member having an opening, at the center thereof, through which the piston rod 21 passes. The valve stopper 55 is formed so that the outer diameter thereof is approximately the same as that of the extension-side first valve 51. The valve stopper 55 prevents the extension-side first valve 51, the extension-side second valve 52, and the extension-side third valve 53, when deformed, from being deformed to the one side further than the valve stopper 55.

Operations and Effects

Next, description will be provided on operations and effects of the hydraulic buffer device 1 of the first embodiment.

Figure 3A:
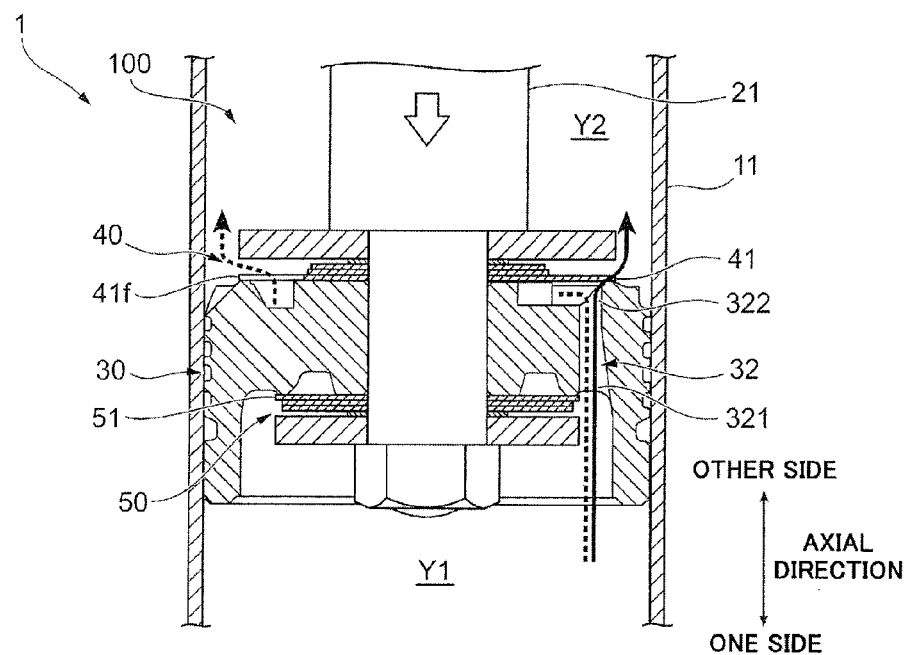
FIGS. 3A and 3B illustrate oil flow at a piston section of the hydraulic buffer device of the first embodiment.
Figure 3B:
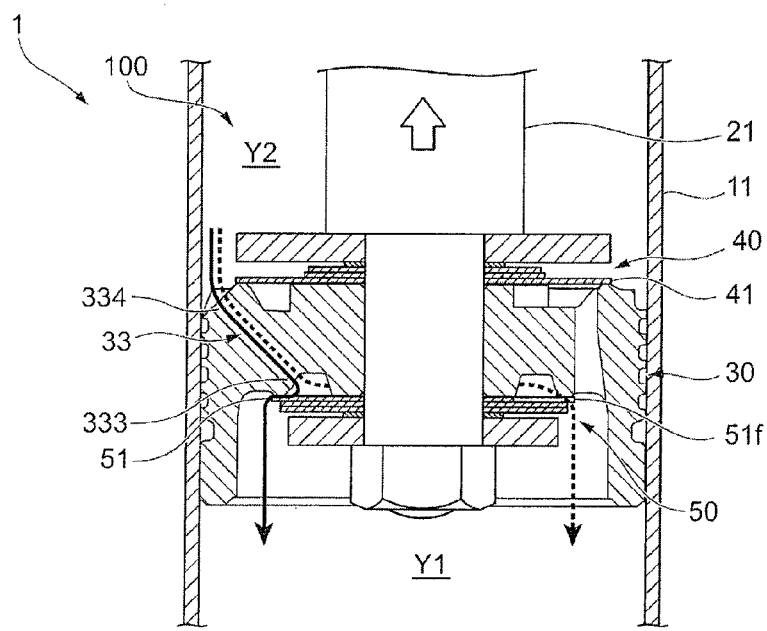

FIG. 3 illustrates oil flow in the piston section 100 of the hydraulic buffer device 1 of the first embodiment. Here, FIG. 3A illustrates oil flow during the compression stroke and FIG. 3B illustrates oil flow during the extension stroke.

During the compression stroke of the hydraulic buffer device 1, the piston rod 21 is moved, against the first cylinder 11, to the one side (lower side in FIG. 1) in the axial direction. The piston section 100 fixed to the piston rod 21 compresses oil in the first oil chamber Y1 and increases pressure in the first oil chamber Y1.

Here, in a case that moving speed of the piston rod 21 is low, being so-called ultraslow, oil flows through the orifices 41f of the compression-side first valve 41 (as indicated by a broken line arrow in the drawing). On the other hand, in a case that the moving speed of the piston rod 21 is relatively high, as illustrated in FIG. 3A, oil in the first oil chamber Y1 opens the compression-side first valve 41 of the first compression-side valve section 40 that closes the second oil path opening 322 of the first compression-side oil path 32 (as indicated by a solid line arrow in the drawing). Then, the oil flows into the second oil chamber Y2 of the piston section 100 on the other side.

Further, at the bottom valve section 60, oil opens the second compression-side valve section 621 that closes the oil path 61R of the bottom piston body 61 and outflows from the first oil chamber Y1 to the reservoir chamber R.

Then, owing to resistance occurring when oil flows through the oil paths (the first compression-side oil path 32, the oil path 61R) and the valves (the first compression-side valve section 40, the second compression-side valve section 621), the hydraulic buffer device 1 generates damping force during the compressing stroke.

During the extension stroke of the hydraulic buffer device 1, the piston rod 21 is moved, against the first cylinder 11, to the other side (upper side in FIG. 1) in the axial direction. The movement of the piston rod 21 causes the first oil chamber Y1 to have negative pressure due to shortage of oil by the amount thereof.

Here, in a case that moving speed of the piston rod 21 is low, being so-called ultraslow, oil flows through the orifices 51f of the extension-side first valve 51 (as indicated by a broken line arrow in the drawing). On the other hand, in a case that the moving speed of the piston rod 21 is relatively high, as illustrated in FIG. 3B, oil in the second oil chamber Y2 opens the extension-side first valve 51 of the first extension-side valve section 50 that closes the third oil path opening 333 of the first extension-side oil path 33 (as indicated by a solid line arrow in the drawing). Then, oil flows into the first oil chamber Y1 of the piston section 100 on the one side.

Further, as illustrated in FIG. 1, oil in the reservoir chamber R flows into the first oil chamber Y1 as opening the second extension-side valve section 622 that closes the oil path 61R of the bottom piston body 61.

Then, owing to resistance occurring when oil flows through the oil paths (the first extension-side oil path 33, the oil path 61R) and the valves (the first extension-side valve section 50, the second extension-side valve section 622), the hydraulic buffer device 1 generates damping force during the extension stroke.

[Operations and Effects of Piston Body 30]

Next, operations and effects of the piston body 30 will be described.

Figure 4:
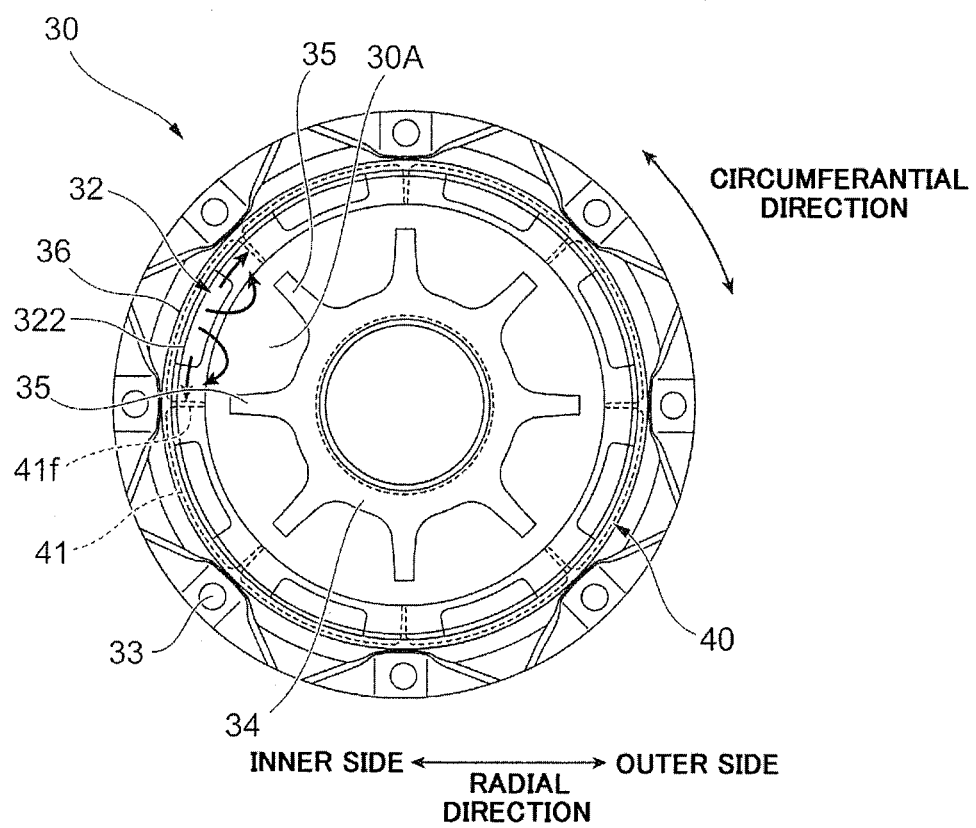
FIG. 4 is a view illustrating oil flow at an oil path opening of the piston body.

FIG. 4 illustrates oil flow at the oil path opening (second oil path opening 322) of the piston body 30.

In the piston section 100, oil outflowing through the second oil path opening 322 of the first compression-side oil path 32 is apt to flow outward in the radial direction, as illustrated in FIG. 4. At that time, since the second oil path opening 322 is apart from the extending section 35 in the radial direction, disturbance and stagnation of flow caused by oil abutting to the extending section 35 is suppressed. Accordingly, oil outflowing through the second oil path opening 322 can be smoothly flown toward the compression-side first valve 41 and the orifices 41f. Consequently, variation of damping force to be generated in the hydraulic buffer device 1 can be reduced.

Further, in the first embodiment, an end portion of the extending section 35 on the outer side in the radial direction is formed into a curved shape. Accordingly, occurrence of disturbance and stagnation of oil flow in the vicinity of the end portion of the extending section 35 is further suppressed.

Second Embodiment

Next, a hydraulic buffer device 1 of a second embodiment will be described.

FIG. 5 illustrates a piston body 230 of the second embodiment.

Figure 5A:
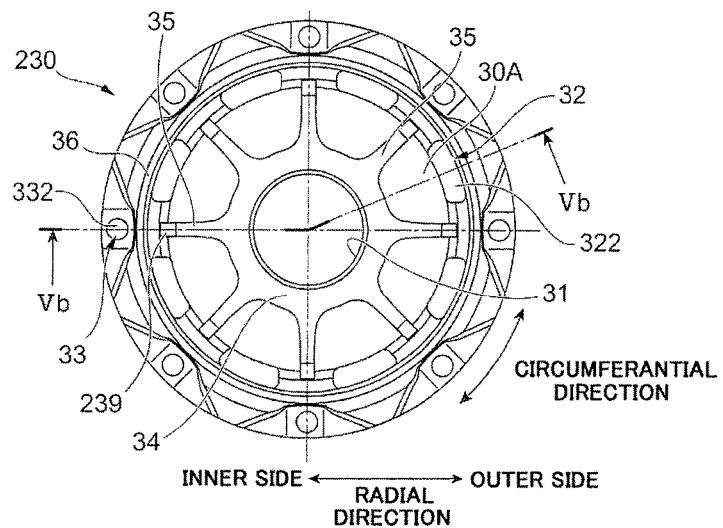
FIGS. 5A to 5C are views illustrating a piston body of a second embodiment.
Figure 5B:
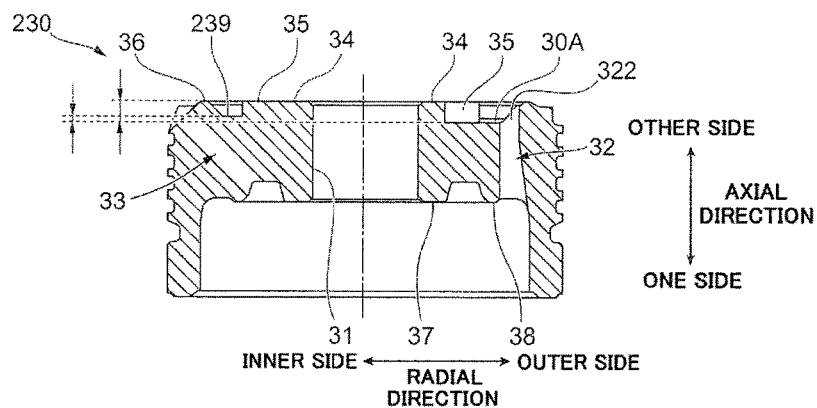
Figure 5C:
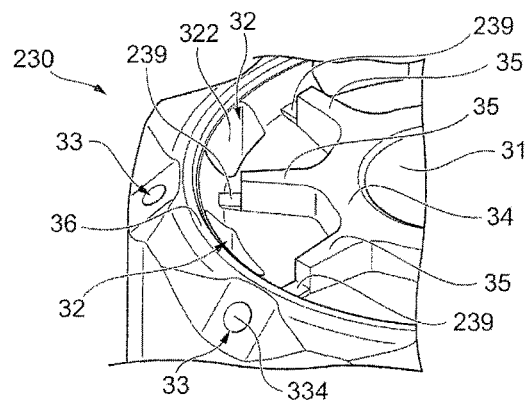

FIG. 5A is a top view of the piston body 230 viewing from the other side, FIG. 5B is a sectional view at Vb-Vb of the piston body 230 illustrated in FIG. 5A, and FIG. 5C is a partial perspective view of the piston body 230 viewing from the other side.

In the description of the second embodiment, the same reference is provided to the same structural element as the abovementioned first embodiment and detailed description thereof is skipped.

As illustrated in FIGS. 5A to 5C, the piston body 230 of the second embodiment includes the through-hole 31, the first compression-side oil path 32, the first extension-side oil path 33, the inner annular section 34, the extending section 35, the outer annular section 36, the one-side inner annular section 37, the one-side outer annular section 38, and a projecting section 239 arranged on the other side. That is, the piston body 230 of the second embodiment is different from that of the other embodiment in a point of including the projecting section 239.

As illustrated in FIG. 5C, the projecting section 239 is arranged at the outer side of the extending section 35 in the radial direction. In the present embodiment, the projecting section 239 is formed as extending in the radial direction from the outer side of the extending section 35 further outward to the outer annular section 36. At least a part of the projecting section 239 in the radial direction positions between the two second oil path openings 322 adjacent in the circumferential direction.

As illustrated in FIG. 5B, the projecting section 239 is projected from the end face 30A on the other side and projection height thereof is lower than that of the extending section 35.

That is, the projecting section 239 is arranged from the outer side of the extending section 35 toward a space between the second oil path openings 322 of the first compression-side oil path 32 in the radial direction of the piston body 230 and the projection height thereof is lower than that of the extending section 35.

According to the piston body 230 of the second embodiment configured as described above, since the second oil path opening 322 is apart from the extending section 35 in the radial direction, disturbance and stagnation of flow caused by oil abutting to the extending section 35 is suppressed. Accordingly, variation of damping force to be generated in the hydraulic buffer device 1 can be reduced.

Further, since the projecting section 239 positions in the vicinity of the outer annular section 36 and between the second oil path openings 322 adjacent in the circumferential direction, interference of oil flowing through the adjacent second oil path openings 322 is suppressed. Accordingly, oil outflowing through the second oil path openings 322 can flow smoothly toward the compression-side first valve 41 and variation of damping force to be generated in the hydraulic buffer device 1 can be further reduced.

First Modification Example

FIG. 6 illustrates a modification example (first modification example) of the piston body 230 of the second embodiment.

Figure 6A:
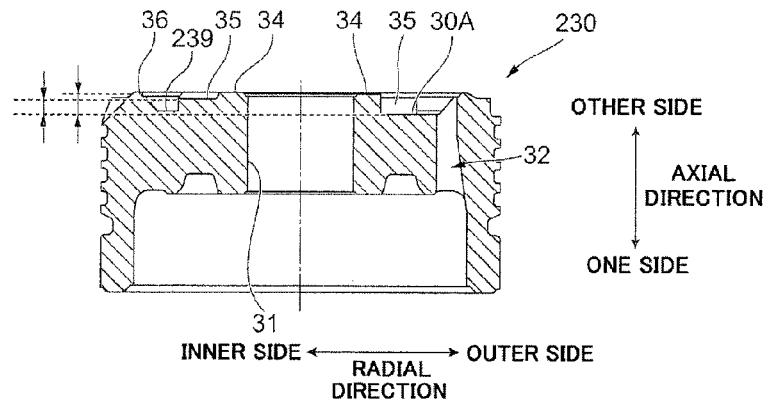
FIGS. 6A to 6C are views illustrating a modification example (first modification example) of the piston body of the second embodiment.

As illustrated in FIG. 6A, in the piston body 230 of the second embodiment, the projection height of the extending section 35 may be lower than that of the inner annular section 34.

According to the piston body 230 of the modification example illustrated in FIG. 6A, since the projection height of the extending section 35 is lower than that of the inner annular section 34, there is formed a gap between the extending section 35 and the compression-side first valve 41 (see FIG. 2B) arranged on the other side. Owing to that oil enters to the gap between the extending section 35 and the compression-side first valve 41, sticking of the compression-side first valve 41 to the extending section 35 is suppressed and operation of the compression-side first valve 41 is stabilized. Consequently, variation of damping force to be generated in the hydraulic buffer device 1 can be further reduced.

Figure 6B:
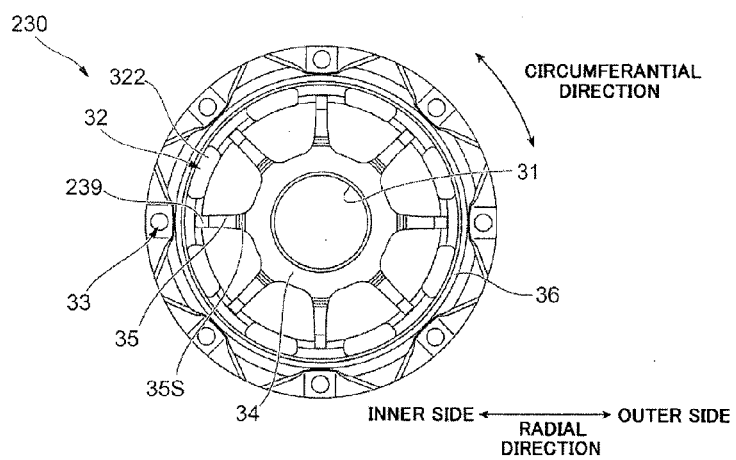

Further, as illustrated in FIG. 6B, in the piston body 230 of the second embodiment, a cutout section 35S concaved toward the one side in the axial direction may be formed at the extending section 35. The cutout section 35S is formed at the inner side of the extending section 35 in the radial direction. That is, the cutout section 35S is formed between the inner annular section 34 and the extending section 35 in the radial direction.

According to the piston body 230 of the modification example illustrated in FIG. 6B, oil circulation in the circumferential direction is promoted, in a state that the compression-side first valve 41 is arranged on the other side, by the cutout section 35S that is arranged as being relatively far from the second oil path opening 322 in the radial direction. Consequently, according to the piston body 230, oil pressure can be applied to the compression-side first valve 41 (see FIG. 2B) evenly in the circumferential direction. Accordingly, variation of damping force to be generated in the hydraulic buffer device 1 can be further reduced.

Here, in the piston body 230 of the second embodiment, the height of the projecting section 239 is not limited, for example, to the height illustrated in FIG. 5. For example, as illustrated FIG. 6C, it is possible to have height in the axial direction being approximately half of the projection height of the extending section 35 in the axial direction.

Figure 6C:
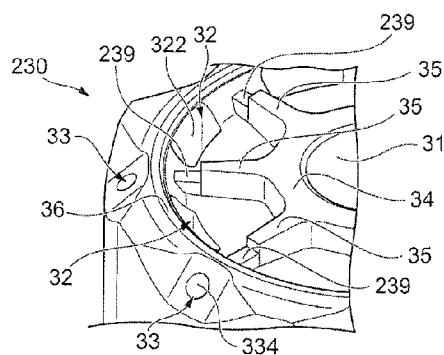

According to the piston body 230 of the modification example illustrated in FIG. 6C configured as described above, variation of damping force to be generated in the hydraulic buffer device 1 can be further reduced.

Third Embodiment

Next, a hydraulic buffer device 1 of a third embodiment will be described.

FIG. 7 illustrates a piston body 330 of the third embodiment.

Figure 7A:
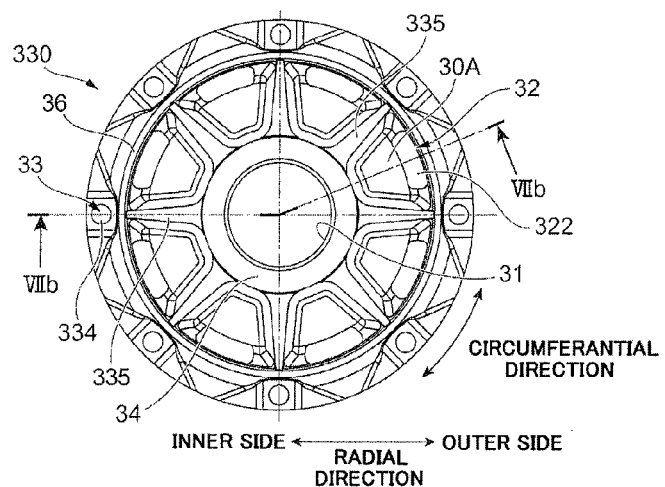
FIGS. 7A to 7C are views illustrating a piston body of a third embodiment.
Figure 7B:
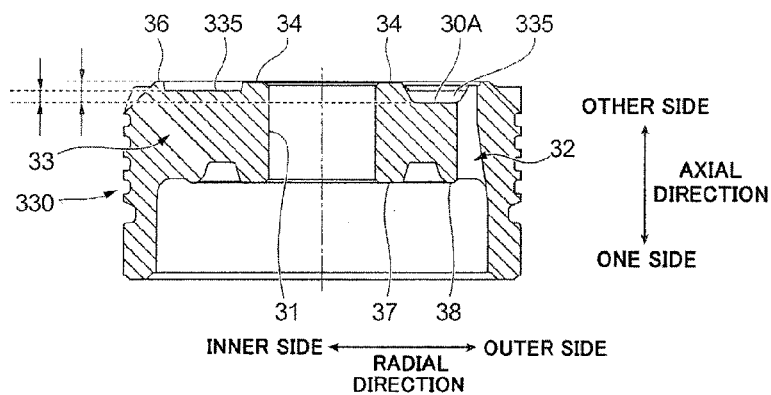
Figure 7C:
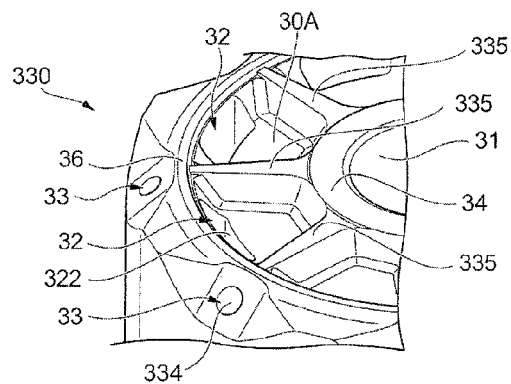

FIG. 7A is a top view of the piston body 330 viewing from the other side, FIG. 7B is a sectional view at VIIb-VIIb of the piston body 330 illustrated in FIG. 7A, and FIG. 7C is a partial perspective view of the piston body 330 viewing from the other side.

In the description of the third embodiment, the same reference is provided to the same structural element as the abovementioned other embodiments and detailed description thereof is skipped.

As illustrated in FIGS. 7A to 7C, the piston body 330 of the third embodiment includes the through-hole 31, the first compression-side oil path 32, the first extension-side oil path 33, the inner annular section 34, an extending section 335 arranged on the other side, the outer annular section 36, the one-side inner annular section 37, and the one-side outer annular section 38. That is, in the piston body 330 of the third embodiment, a configuration of the extending section 335 is different from that of the other embodiments.

The hydraulic buffer device 1 of the third embodiment includes the piston body 330 (channel forming section) that forms the first compression-side oil path 32 (channel) through which oil (fluid) flows in accordance with relative movement of the piston rod 21 (rod) (see FIG. 1) against the first cylinder 11 (cylinder) (see FIG. 1), the first compression-side valve section 40 (valve) (see FIG. 1) that performs opening-closing of the first compression-side oil path 32 of the piston body 330, the inner annular section 34 (annular projecting section) annularly formed as projecting in the axial direction of the piston body 330 from the piston body 330 toward the first compression-side valve section 40, and the extending section 335 that is formed as extending outward further from the outer side of the inner annular section 34 in the radial direction of the piston body 330 and as having projection height from the piston body 330 being lower than that of the inner annular section 34.

As illustrated in FIG. 7A, the extending section 335 is arranged as extending outward in the radial direction at the outer circumference of the inner annular section 34. Further, the extending section 335 is formed as extending to the outer annular section 36 (outer annular projecting section). A plurality (eight in the present embodiment) of the extending sections 335 are arranged in the circumferential direction. As illustrated in FIGS. 7A and 7C, at least a part of the extending section 335 in the radial direction positions between the two second oil path openings 322 adjacent in the circumferential direction.

As illustrated in FIG. 7B, the extending section 335 is projected toward the other side in the axial direction. In the present embodiment, projection height of the extending section 335 is set to be lower than that of the inner annular section 34.

In the third embodiment, since the projection height of the extending section 335 is formed as being lower than that of the inner annular section 34, sticking of the compression-side first valve 41 (see FIG. 2B) to the extending section 335 is suppressed and operation of the compression-side first valve 41 is stabilized. Consequently, variation of damping force to be generated can be reduced.

Second Modification Example

FIG. 8 illustrates a modification example (second modification example) of the piston body 330 of the third embodiment.

Figure 8A:
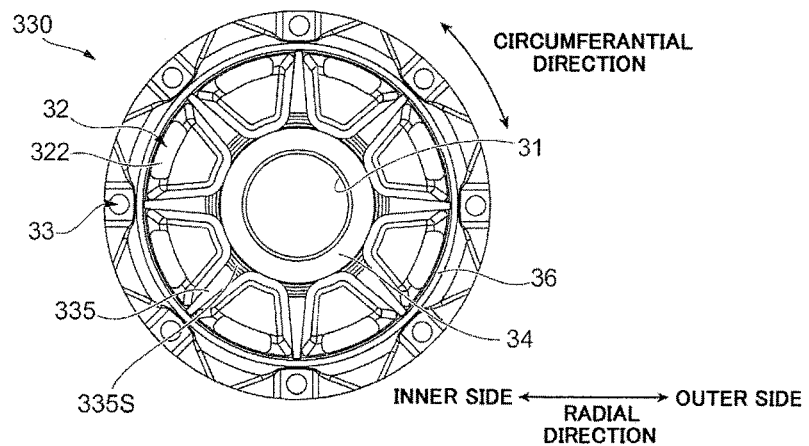
FIGS. 8A to 8C are views illustrating a modification example (second modification example) of the piston body of the third embodiment.

As illustrated in FIG. 8A, in the piston body 330 of the third embodiment, the extending section 335 may include a cutout section 335S concaved toward the one side in the axial direction as extending in the circumferential direction.

According to the piston body 330 of the modification example illustrated in FIG. 8A, oil circulation in the circumferential direction is promoted by the cutout section 335S in a state that the compression-side first valve 41 (see FIG. 2B) is arranged on the other side. Consequently, according to the piston body 330, oil pressure can be applied to the compression-side first valve 41 evenly in the circumferential direction.

Figure 8B:
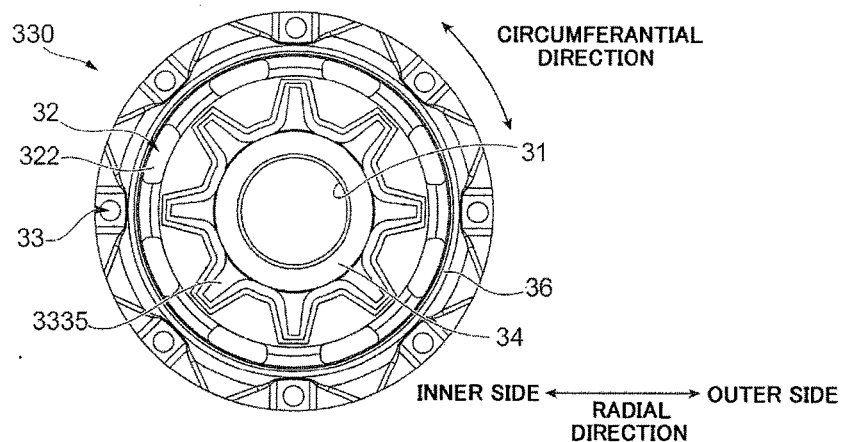

As illustrated in FIG. 8B, in the piston body 330 of the third embodiment, an extending section 3335 may be formed to extend, in the radial direction, from the inner annular section 34 to a position at the inner side from the second oil path opening 322 of the first compression-side oil path 32. That is, the extending section 3335 is formed as being apart from the outer annular section 36. In the example illustrated in FIG. 8B, an outer end part of the extending section 3335 in the radial direction is formed into a shape having corners.

According to the piston body 330 of the modification example illustrated in FIG. 8B, since the second oil path opening 322 is apart from the extending section 3335 in the radial direction, disturbance and stagnation of flow caused by oil abutting to the extending section 3335 is suppressed. Accordingly, variation of damping force to be generated in the hydraulic buffer device 1 can be reduced.

Figure 8C:
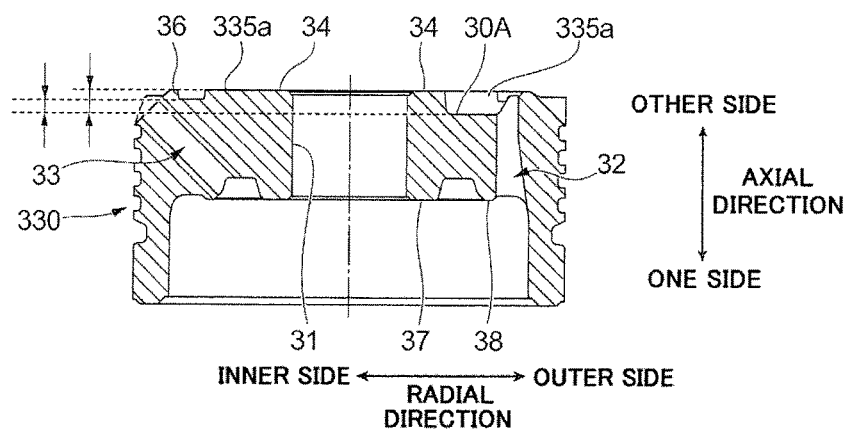

As illustrated in FIG. 8C, in the piston body 330 of the third embodiment, projection height of the extending section 335a may be formed as being the same as projection height of the inner annular section 34 from the inner side to the outer side in the radial direction while being lower than that of the inner annular section 34 at a part of the outer side in the radial direction. In the example illustrated in FIG. 8C, projection height of the extending section 335a is formed as being lower than projection height of the inner annular section 34 at a part where the second oil path opening 322 is formed in the radial direction.

According to the piston body 330 of the modification example illustrated in FIG. 8C as configured above, variation of damping force to be generated in the hydraulic buffer device 1 can be further reduced.

Fourth Embodiment

Next, a hydraulic buffer device 1 of a fourth embodiment will be described.

FIG. 9 illustrates a piston body 430 of the fourth embodiment.

Figure 9A:
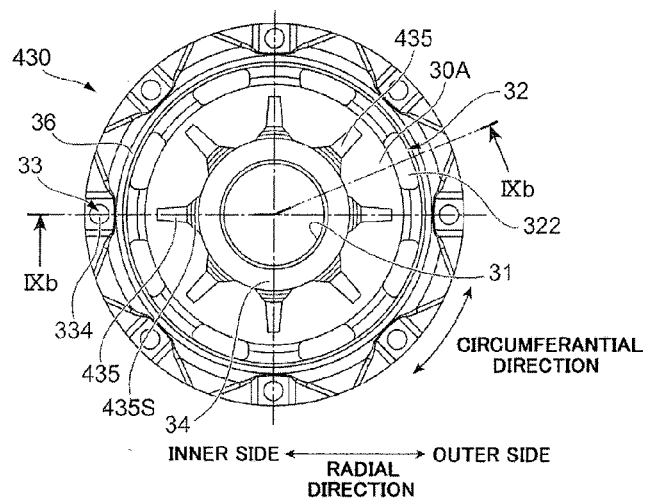
FIGS. 9A to 9C are views illustrating a piston body of a fourth embodiment.
Figure 9B:
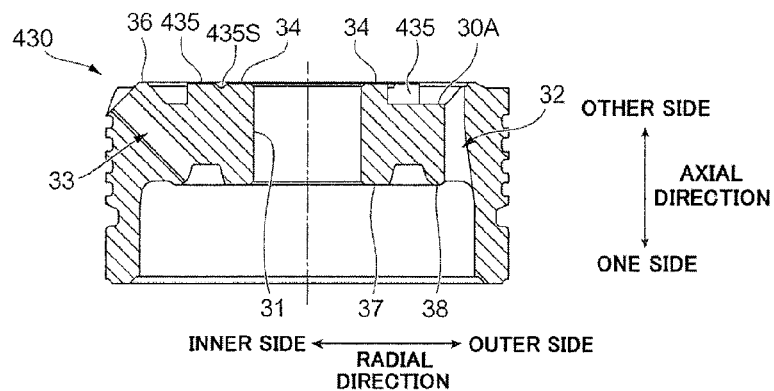
Figure 9C:
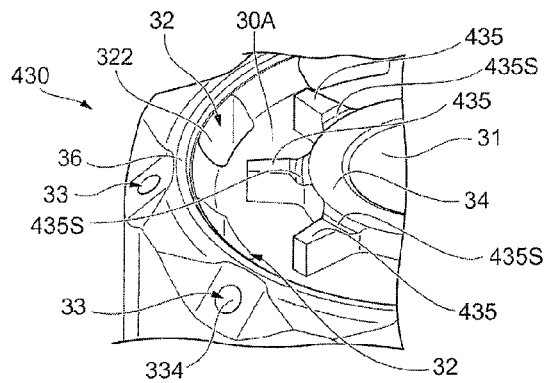

FIG. 9A is a top view of the piston body 430 viewing from the other side, FIG. 9B is a sectional view at IXb-IXb of the piston body 430 illustrated in FIG. 9A, and FIG. 9C is a partial perspective view of the piston body 430 viewing from the other side.

In the description of the fourth embodiment, the same reference is provided to the same structural element as the abovementioned other embodiments and detailed description thereof is skipped.

As illustrated in FIG. 9A, the piston body 430 of the fourth embodiment includes the through-hole 31, the first compression-side oil path 32, the first extension-side oil path 33, the inner annular section 34, an extending section 435 arranged on the other side, the outer annular section 36, the one-side inner annular section 37, and the one-side outer annular section 38. Here, in the piston body 430 of the fourth embodiment, a configuration of the extending section 435 is different from that of the other embodiments.

As illustrated in FIG. 9A, the extending section 435 is arranged as extending outward in the radial direction at the outer side of the inner annular section 34. A plurality (eight in the present embodiment) of the extending sections 435 are arranged in the circumferential direction. As illustrated in FIG. 9A, an outer end part of the extending section 435 in the radial direction is formed into a curved shape as being convexed outward. The extending section 435 is formed as extending in the radial direction to a position at the inner side from the second oil path opening 322. The respective extending sections 435 are arranged in the circumferential direction alternately with the respective second oil path openings 322.

As illustrated in FIG. 9B, the extending section 435 is projected from the piston body 430 toward the other side in the axial direction. The projection height of the extending section 435 is formed as being the same as that of the inner annular section 34. Further, as illustrated in FIG. 9C, each extending section 435 includes a cutout section 435S concaved in the axial direction of the piston body 430 as extending in the circumferential direction of the piston body 430. In the present embodiment, as illustrated in FIG. 9B, the cutout section 435S is formed as being concaved to a midpoint of the height of the extending section 435 in the axial direction.

Here, the projection height of the extending section 435 may be higher than the projection height of the inner annular section 34.

According to the piston body 430 of the fourth embodiment configured as described above, since the second oil path opening 322 is apart from the extending section 435 in the radial direction, disturbance and stagnation of flow caused by oil abutting to the extending section 435 is suppressed. Accordingly, variation of damping force to be generated in the hydraulic buffer device 1 can be reduced.

Further, according to the piston body 430 of the fourth embodiment, oil circulation in the circumferential direction is promoted by the cutout section 435S in a state that the compression-side first valve 41 (see FIG. 2A) is arranged on the other side. Consequently, according to the piston body 430, oil pressure can be applied to the compression-side first valve 41 evenly in the circumferential direction. Accordingly, variation of damping force to be generated in the hydraulic buffer device 1 can be further reduced.

Third Modification Example

FIG. 10 illustrates a modification example (third modification example) of the piston body 430 of the fourth embodiment.

Figure 10A:
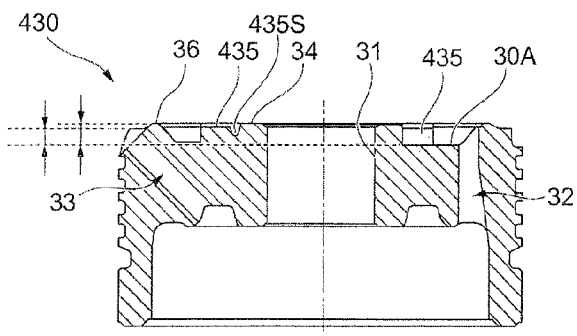
FIGS. 10A to 10C are views illustrating a modification example (third modification example) of the piston body of the fourth embodiment.

In the piston body 430 of the fourth embodiment, projection height of the extending section 435 may be formed as being lower than that of the inner annular section 34, as illustrated in FIG. 10A.

According to the piston body 430 illustrated in FIG. 10A, since the projection height of the extending section 435 is formed as being lower than that of the inner annular section 34, sticking of the compression-side first valve 41 (see FIG.

2B) to the extending section 435 is suppressed and operation of the compression-side first valve 41 is stabilized. Consequently, variation of damping force to be generated can be reduced.

Figure 10B:
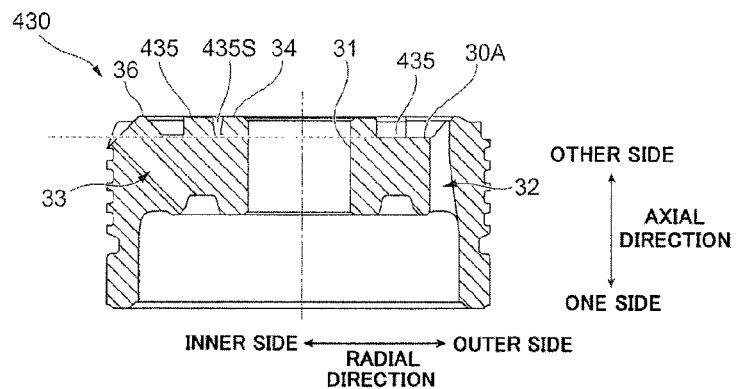

Further, in the piston body 430 of the fourth embodiment, depth of the cutout section 435S in the axial direction may be the same as the projection height of the extending section 435, as illustrated in FIG. 10B. That is, the cutout section 435S may be formed to the end face 30A on the other side.

According to the piston body 430 illustrated in FIG. 10B, oil circulation in the circumferential direction is promoted, in a state that the compression-side first valve 41 (see FIG. 2B) is arranged on the other side, by the cutout section 435S that is arranged as being relatively deep. Consequently, according to the piston body 430, oil pressure can be applied to the compression-side first valve 41 evenly in the circumferential direction. Accordingly, variation of damping force to be generated in the hydraulic buffer device 1 can be further reduced.

Figure 10C:
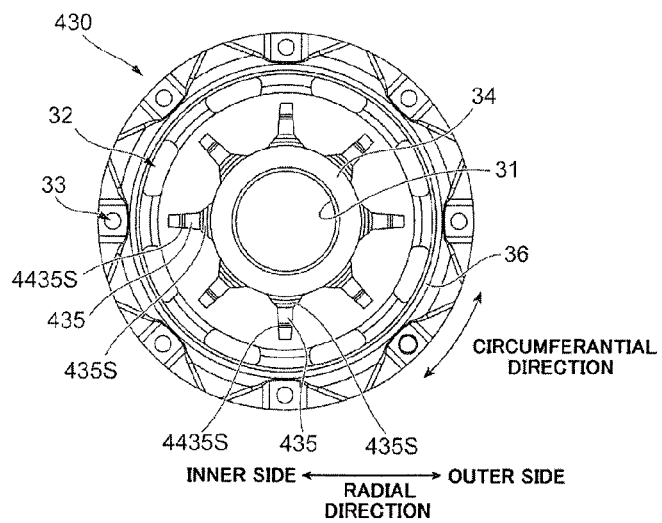

Further, in the piston body 430 of the fourth embodiment, a plurality of cutout sections may be formed in the radial direction of the respective extending sections 435, as illustrated in FIG. 10C. Specifically, in addition to the cutout section 435S, a second cutout section 4435S may be arranged at the outer side of the cutout section 435S in the radial direction.

According to the piston body 430 illustrated in FIG. 10C, oil circulation in the circumferential direction is promoted by the cutout section 435S and the second cutout section 4435S in a state that the compression-side first valve 41 (see FIG. 2B) is arranged on the other side. Consequently, according to the piston body 430, oil pressure can be applied to the compression-side first valve 41 evenly in the circumferential direction. Accordingly, variation of damping force to be generated in the hydraulic buffer device 1 can be further reduced.

Fifth Embodiment

Next, a hydraulic buffer device 1 of a fifth embodiment will be described.

FIG. 11 illustrates a piston body 530 of the fifth embodiment.

Figure 11A:
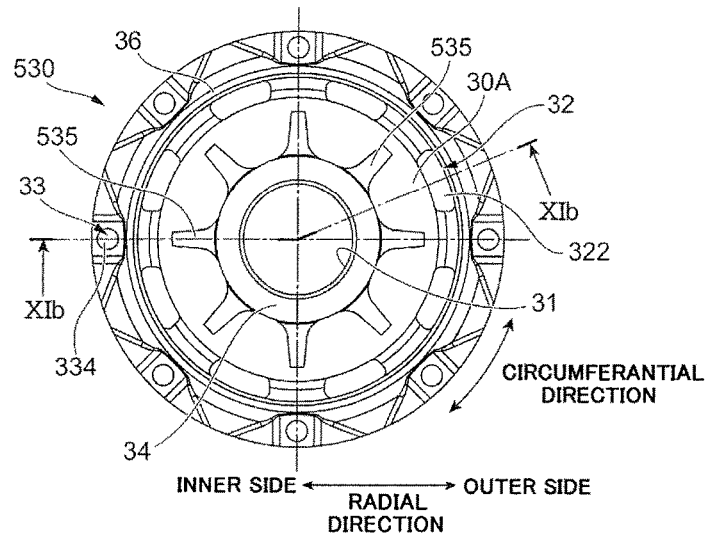
FIGS. 11A to 11C are views illustrating a piston body of a fifth embodiment.
Figure 11B:
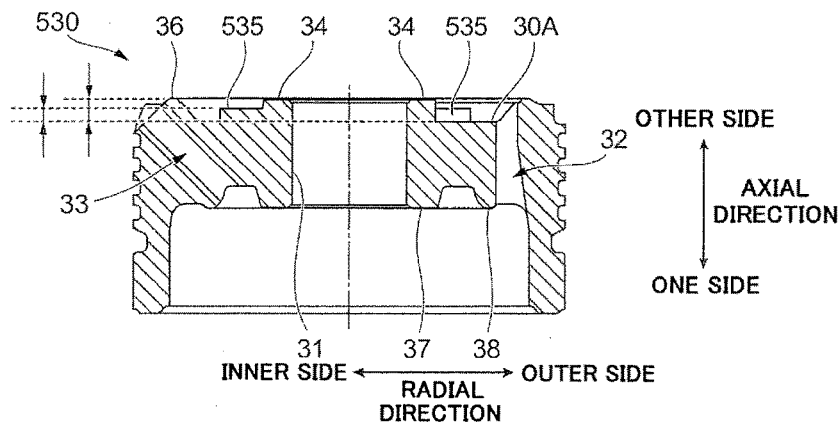
Figure 11C:
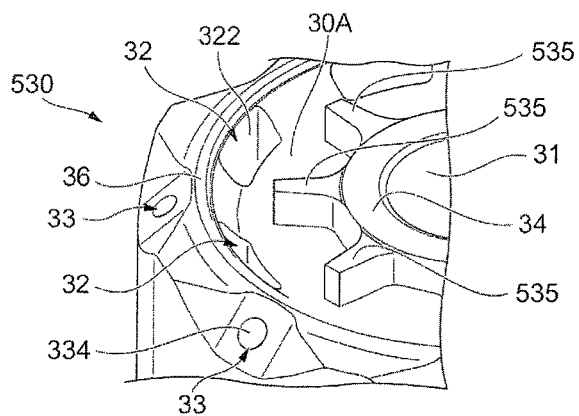

FIG. 11A is a top view of the piston body 530 viewing from the other side, FIG. 11B is a sectional view at XIb-XIb of the piston body 530 illustrated in FIG. 11A, and FIG. 11C is a partial perspective view of the piston body 530 viewing from the other side.

In the description of the firth embodiment, the same reference is provided to the same structural element as the abovementioned other embodiments and detailed description thereof is skipped.

As illustrated in FIG. 11A, the piston body 530 of the fifth embodiment includes the through-hole 31, the first compression-side oil path 32, the first extension-side oil path 33, the inner annular section 34, an extending section 535, the outer annular section 36, the one-side inner annular section 37, and the one-side outer annular section 38. That is, in the piston body 530 of the fifth embodiment, a configuration of the extending section 535 is different from that of the other embodiments.

As illustrated in FIG. 11A, the extending section 535 is arranged as extending outward in the radial direction at the outer side of the inner annular section 34. A plurality (eight in the present embodiment) of the extending sections 535 are arranged in the circumferential direction. As illustrated in FIG. 11A, an outer end part of the extending section 535 in the radial direction is formed into a curved shape as being convexed outward. The extending section 535 is formed as extending in the radial direction to a position at the inner side from the second oil path opening 322. The respective extending sections 535 are arranged in the circumferential direction alternately with the respective second oil path openings 322.

As illustrated in FIGS. 11B and 11C, the extending section 535 is projected toward the other side in the axial direction. In the fifth embodiment, the extending section 535 is formed so that projection height in the axial direction of the piston body 530 is lower than that of the inner annular section 34.

According to the piston body 530 of the fifth embodiment configured as described above, since the second oil path opening 322 is apart from the extending section 535 in the radial direction, disturbance and stagnation of flow caused by oil abutting to the extending section 535 is suppressed. Accordingly, variation of damping force to be generated in the hydraulic buffer device 1 can be reduced.

Further, since the projection height of the extending section 535 is formed as being lower than that of the inner annular section 34, sticking of the compression-side first valve 41 (see FIG. 2B) to the extending section 535 is suppressed and operation of the compression-side first valve 41 is stabilized. Consequently, variation of damping force to be generated can be reduced.

Sixth Embodiment and Seventh Embodiment

Next, a hydraulic buffer device 1 of a sixth embodiment will be described.

Figure 12A:
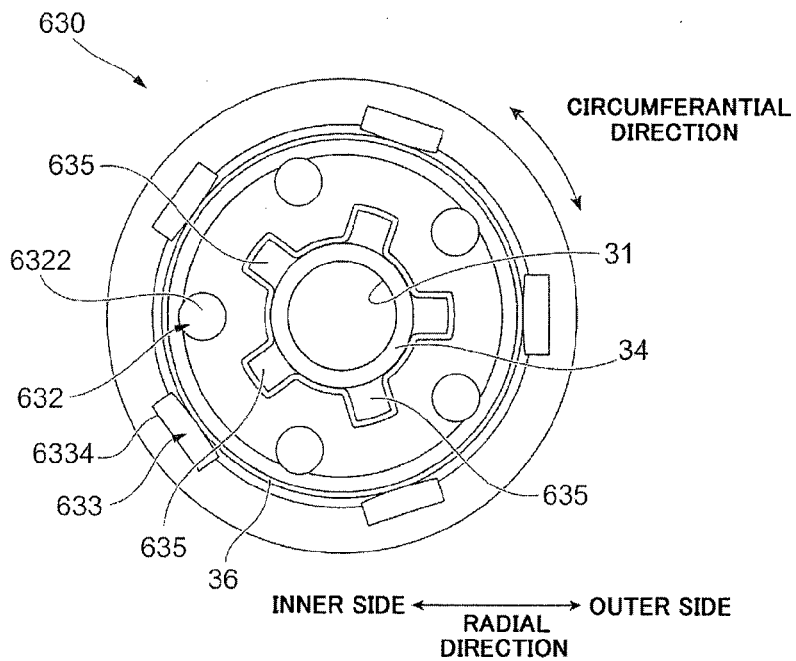
FIG. 12A is a view illustrating a piston body of a sixth embodiment and FIG. 12B is a view illustrating a piston body of a seventh embodiment.
Figure 12B:
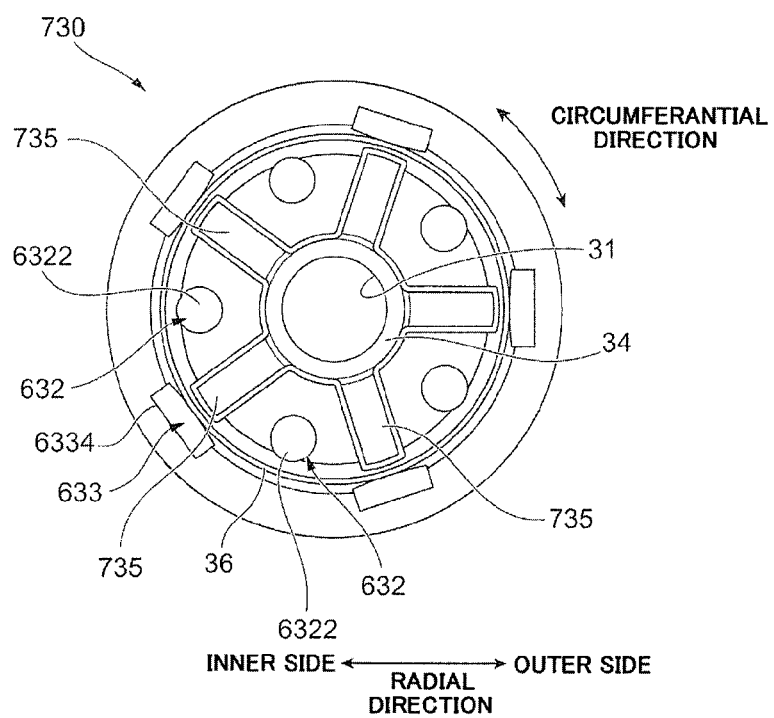

FIG. 12A is a view illustrating a piston body 630 of a sixth embodiment and FIG. 12B is a view illustrating a piston body 730 of a seventh embodiment.

FIGS. 12A and 12B are top views of the piston bodies (630, 730) viewing from the other side.

In the description of the sixth and seventh embodiments, the same reference is provided to the same structural element as the abovementioned other embodiments and detailed description thereof is skipped.

As illustrated in FIG. 12A, the piston body 630 of the sixth embodiment includes the through-hole 31, a first compression-side oil path 632, a first extension-side oil path 633, the inner annular section 34, an extending section 635, and the outer annular section 36.

A basic configuration of the piston body 630 of the sixth embodiment is similar to that of the piston body 630 of the first embodiment. Here, shapes of the first compression-side oil path 632 and the first extension-side oil path 633 are different from those of the first compression-side oil path 32 and the first extension-side oil path 33 of the piston body 30 of the first embodiment.

Specifically, as illustrated in FIG. 12A, a second oil path opening 6322 facing to the first oil chamber Y1 (see FIG. 1) of the first compression-side oil path 632 is formed into a circular shape. Further, as illustrated in FIG. 12A, a fourth oil path opening 6334 facing to the second oil chamber Y2 (see FIG. 1) of the first extension-side oil path 633 is formed into a rectangular shape.

As illustrated in FIG. 12A, the extending section 635 is arranged as extending outward in the radial direction at the outer side of the inner annular section 34. A plurality (five in the present embodiment) of the extending sections 635 are arranged in the circumferential direction. As illustrated in FIG. 12A, an outer end part of the extending section 35 in the radial direction is formed into a rectangle shape. The extending section 635 is formed as extending in the radial direction to a position at the inner side from the second oil path opening 6322. The respective extending sections 635 are arranged in the circumferential direction alternately with the respective second oil path openings 6322.

According to the piston body 630 of the sixth embodiment configured as described above, since the second oil path opening 6322 is apart from the extending section 635 in the radial direction, disturbance and stagnation of flow caused by oil abutting to the extending section 635 is suppressed. Accordingly, variation of damping force to be generated in the hydraulic buffer device 1 can be reduced.

Here, projection height of the extending section 635 may be the same as or higher than the projection height of the inner annular section 34. Further, the extending section 635 may include a cutout section concaved in the axial direction as extending in the circumferential direction.

Next, the piston body 730 of the seventh embodiment will be described.

As illustrated in FIG. 12B, the piston body 730 of the seventh embodiment includes the through-hole 31, the first compression-side oil path 632, the first extension-side oil path 633, the inner annular section 34, an extending section 735, and the outer annular section 36.

As illustrated in FIG. 12B, in the piston body 730 of the seventh embodiment, the extending section 735 is arranged as extending outward in the radial direction at the outer circumference of the inner annular section 34. Further, the extending section 735 is formed as extending to the outer annular section 36. Accordingly, as illustrated in FIG. 12B, in the piston body 730 of the seventh embodiment, at least a part of each extending section 735 in the radial direction positions between the two second oil path openings 6322 adjacent in the circumferential direction.

Further, the extending section 735 is projected toward the other side in the axial direction. In the present embodiment, projection height of the extending section 735 is set to be lower than that of the inner annular section 34.

According to the piston body 730 of the seventh embodiment configured as described above, since the projection height of the extending section 735 is formed as being lower than that of the inner annular section 34, sticking of the compression-side first valve 41 (see FIG. 2B) to the extending section 735 is suppressed and operation of the compression-side first valve 41 is stabilized. Consequently, variation of damping force to be generated can be reduced.

Here, the projection height of the extending section 735 may be formed as being higher than the projection height of the inner annular section 34. Further, the extending section 735 may include a cutout section concaved in the axial direction as extending in the circumferential direction.

Eighth Embodiment

Next, a hydraulic buffer device 1 of an eighth embodiment will be described.

Figure 13:
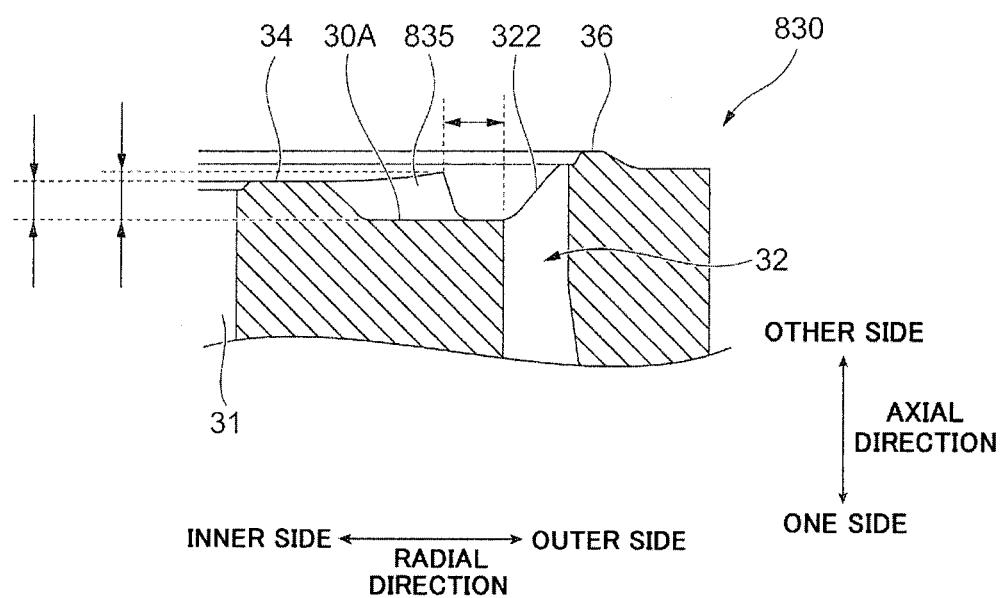
FIG. 13 is a partial sectional view of a piston body of an eighth embodiment.

FIG. 13 is a partial sectional view of a piston body 830 of the eighth embodiment.

In the description of the eighth embodiment, the same reference is provided to the same structural element as the abovementioned first embodiment and detailed description thereof is skipped.

A basic configuration of the piston body 830 of the seventh embodiment is similar to that of the piston body 30 of the abovementioned first embodiment. Here, a configuration of an extending section 835 of the piston body 830 of the eighth embodiment is different from that of the other embodiments.

Specifically, projection height of the extending section 835 varies from the inner side toward the outer side in the radial direction. In the eighth embodiment, the height of the extending section 835 is set as being equal to or higher than projection height of the inner annular section 34. Further, the extending section 835 is formed so that the projection height gradually increases from the inner side toward the outer side in the radial direction.

According to the piston body 830 of the eighth embodiment configured as described above as well, since the second oil path opening 322 is apart from the extending section 835 in the radial direction, disturbance and stagnation of flow caused by oil abutting to the extending section 835 is suppressed. Accordingly, variation of damping force to be generated in the hydraulic buffer device 1 can be reduced.

Fourth to Sixth Modification Examples

Next, description will be provided on fourth to sixth modification examples of the hydraulic buffer device 1 of the first embodiment.

Figure 14A:
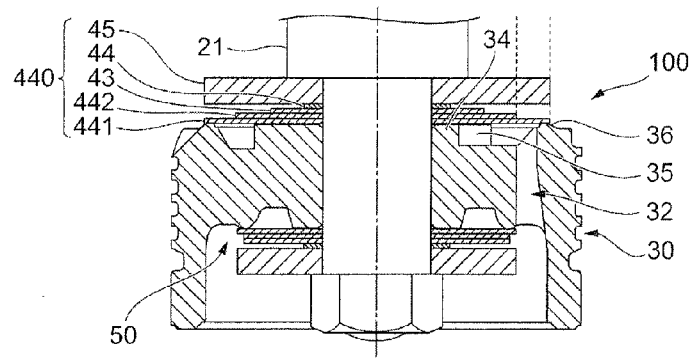
FIGS. 14A to 14C are views illustrating hydraulic buffer devices of fourth to sixth modification examples.
Figure 14B:
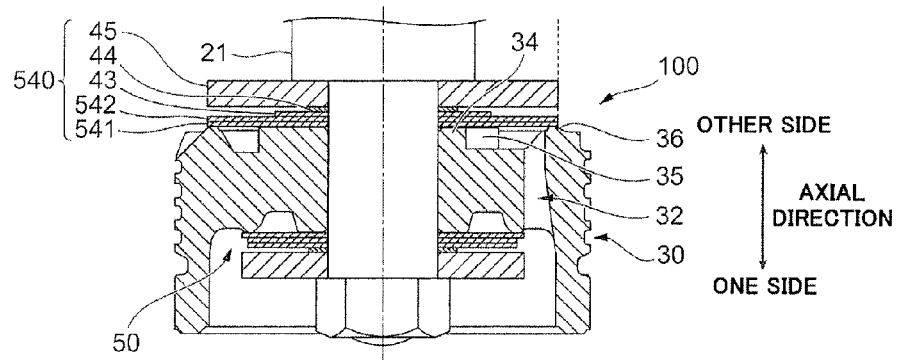
Figure 14C:
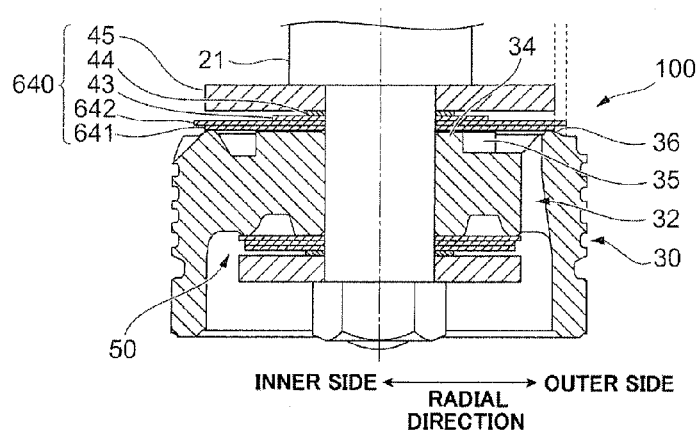

FIG. 14 illustrates hydraulic buffer devices 1 of the fourth to sixth modification examples. FIG. 14A illustrates the hydraulic buffer device 1 of the fourth modification example of the first embodiment, FIG. 14B illustrates the hydraulic buffer device 1 of the fifth modification example of the first embodiment, and FIG. 14C illustrates the hydraulic buffer device 1 of the sixth modification example of the first embodiment.

A basic configuration of each of the hydraulic buffer devices 1 of the fourth to sixth modification examples is similar to that of the abovementioned first embodiment. Here, a configuration of each first compression-side valve section (440, 540, 640) is different from the first compression-side valve 40 of the first embodiment.

As illustrated in FIG. 14A, in the first compression-side valve section 440 of the fourth modification example, the outer diameter of a compression-side first valve 441 is set larger than the outer diameter of the outer annular section 36. Further, the outer diameter of a compression-side second valve 442 is set larger than the outer diameter of the extending section 35. That is, the outer diameter of the compression-side second valve 442 does not position above the extending section 35.

As illustrated in FIG. 14B, in the first compression-side valve section 540 of the fifth modification example, the outer diameter of a compression-side first valve 541 is set larger than the outer diameter of the outer annular section 36. Further, the outer diameter of a compression-side second valve 542 is set equal to the outer diameter of the compression-side first valve 541.

As illustrated in FIG. 14C, in the first compression-side valve section 640 of the sixth modification example, the outer diameter of a compression-side first valve 641 is set larger than the outer diameter of the outer annular section 36. Further, the outer diameter of a compression-side second valve 642 is set larger than the outer diameter of the compression-side first valve 641.

According to the hydraulic buffer devices 1 of the fourth to sixth modification examples configured as described above, since the second oil path opening 322 is apart from the extending section 35 in the radial direction in the piston body 30, disturbance and stagnation of flow caused by oil abutting to the extending section 35 is suppressed. Accordingly, variation of damping force to be generated in the hydraulic buffer device 1 can be reduced.

In the above, the fourth to sixth modification examples are described using examples applied to the hydraulic buffer device 1 of the first embodiment. However, it is also possible to be applied to the other hydraulic buffer devices 1 of the second to eighth embodiments.

Seventh to Ninth Modification Examples

Next, description will be provided on seventh to ninth modification examples of the hydraulic buffer device 1 of the first embodiment.

Figure 15A:
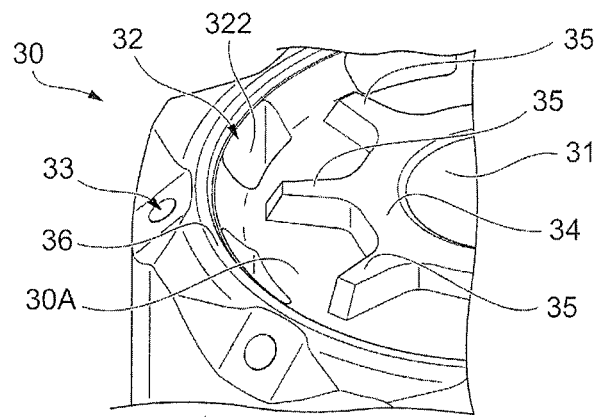
FIGS. 15A to 15C are views illustrating hydraulic buffer devices of seventh to ninth modification examples.
Figure 15B:
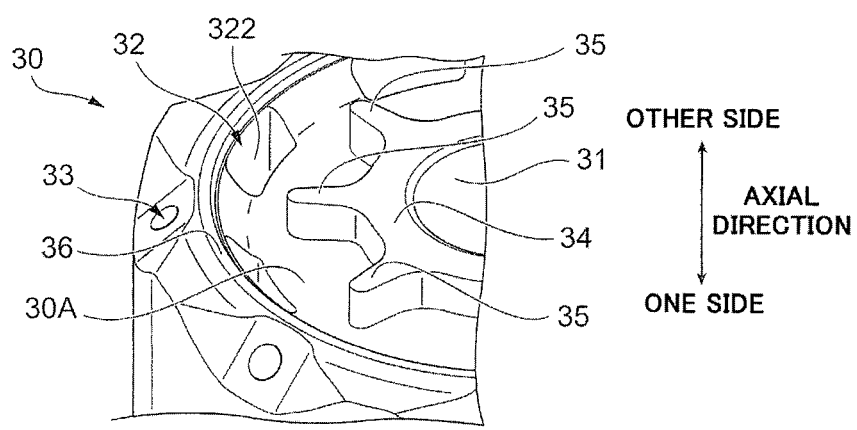
Figure 15C:
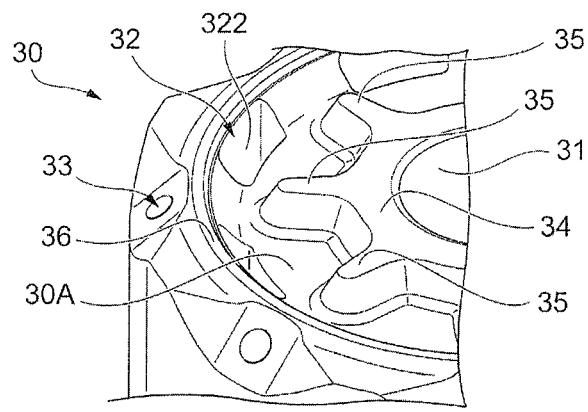

FIG. 15 illustrates hydraulic buffer devices 1 of the seventh to ninth modification examples. FIG. 15A illustrates the hydraulic buffer device 1 of the seventh modification example of the first embodiment, FIG. 15B illustrates the hydraulic buffer device 1 of the eighth modification example of the first embodiment, and FIG. 15C illustrates the hydraulic buffer device 1 of the ninth modification example of the first embodiment.

As illustrated in FIG. 15A, in the piston body 30 of the seventh modification example, an outer end part of the extending section 35 in the radial direction is formed into a rectangular shape having corners in a plane view viewing from the other side. Further, an outer shape of a side portion of the extending section 35 is formed so that the other side is larger than the one side. That is, the extending section 35 is formed as being tapered in the axial direction. Thus, the extending section 35 of the first embodiment may be formed as the seventh modification example.

As illustrated in FIG. 15B, in the piston body 30 of the eighth modification example, an outer end part of the extending section 35 in the radial direction is formed into a curved shape as being convexed outward in the radial direction in a plane view viewing from the other side. Further, an outer shape of a side portion of the extending section 35 is formed evenly from the other side to the one side. Thus, the extending section 35 of the first embodiment may be formed as the eighth modification example.

As illustrated in FIG. 15C, in the piston body 30 of the ninth modification example, an outer end part of the extending section 35 in the radial direction is formed into a curved shape as being convexed outward in the radial direction in a plane view viewing from the other side. Further, an outer shape of a side portion of the extending section 35 is formed so that the one side is larger than the other side. That is, the extending section 35 is formed as being tapered in the axial direction. Thus, the extending section 35 of the first embodiment may be formed as the ninth modification example.

According to the seventh to ninth modification examples configured as described above as well, since the second oil path opening 322 is apart from the extending section 35 in the radial direction, disturbance and stagnation of flow caused by oil abutting to the extending section 35 is suppressed. Accordingly, variation of damping force to be generated in the hydraulic buffer device 1 can be reduced. In particular, in the eighth and ninth modification examples, since the outer end part of the extending section 35 in the radial direction is formed into a curved shape, disturbance and stagnation of oil flow in the vicinity of the end part of the extending section 35 is further suppressed.

In the above, the seventh to ninth modification examples are described using examples applied to the hydraulic buffer device 1 of the first embodiment. However, it is also possible to be applied to hydraulic buffer devices 1 of the second to eighth embodiments.

Further, although the extending section 35 is formed only on the other side in the first embodiment, the extending section 35 may be formed on the one side as well as the other side. Much the same is true on the hydraulic buffer devices 1 of the other embodiments.

Further, each configuration of the piston bodies (30, 230, 330, 430, 530, 630, 730, 830) in the abovementioned embodiments may be applied to the bottom piston body 61.

Here, the hydraulic buffer device 1 of each abovementioned embodiment is a so-called double-cylinder hydraulic buffer device 1. However, the present invention may be applied to a so-called triple-cylinder hydraulic buffer device 1 including a first cylinder, a second cylinder, and a third cylinder arranged in the order thereof from the inner side to the outer side in the radial direction as being axially centered.

DESCRIPTION OF REFERENCES

1: Hydraulic buffer device, 11: First cylinder, 21: Piston rod, 30: Piston body, 32: First compression-side oil path, 33: First extension-side oil path, 34: Inner annular section, 35: Extending section, 35S: Cutout section, 36: Outer annular section, 40: First compression-side valve section, 41: Compression-side first valve, 42: Compression-side second valve, 43: Compression-side third valve, 44: Annular base, 50: First extension-side valve section.

The invention claimed is:

1. A pressure buffer device, comprising:
a cylinder that stores fluid;
a rod that moves in a cylinder axial direction with an end part thereof on one side located in the cylinder and an end part thereof on the other side projected from an opening of the cylinder; and
a damping force generating section that generates damping force for relative movement of the rod against the cylinder, wherein
the damping force generating section including a channel forming section that forms a channel through which the fluid flows in accordance with the relative movement of the rod against the cylinder, a valve that performs opening-closing of the channel of the channel forming section, an annular projecting section that is annularly formed as projecting in an axial direction of the channel forming section from the channel forming section toward the valve, and an extending section that extends in a radial direction of the channel forming section from an outer side of the annular projecting section,
an outermost end of the extending section in the radial direction is provided at a radially inner side of an innermost portion of a channel opening of the channel, and
the extending section projects in the axial direction from the channel forming section toward the valve.

2. The pressure buffer device according to claim 1, wherein projection height of the extending section in the axial direction is equal to or higher than the annular projecting section.

3. The pressure buffer device according to claim 1, wherein projection height of the extending section in the axial direction is lower than the annular projecting section.

4. The pressure buffer device according to claim 1, wherein the damping force generating section further includes a projecting section that is formed in the radial direction from the outer side of the extending section toward between the channel openings of the channel as having projection height being lower than the extending section.

5. The pressure buffer device according to claim 1, wherein the extending section further includes a cutout section that is concaved in the axial direction as extending in a circumferential direction of the channel forming section.

6. The pressure buffer device according to claim 5, wherein the cutout section is concaved to a midpoint of height in the axial direction of the extending section.

7. A pressure buffer device, comprising:
a cylinder that stores fluid;
a rod that moves in a cylinder axial direction with an end part thereof on one side located in the cylinder and an end part thereof on the other side projected from an opening of the cylinder; and
a damping force generating section that generates damping force for relative movement of the rod against the cylinder,
the damping force generating section including a channel forming section that forms a channel through which the fluid flows in accordance with the relative movement of the rod against the cylinder, a valve that performs opening-closing of the channel of the channel forming section, an annular projecting section that is annularly formed as projecting in an axial direction of the channel forming section from the channel forming section toward the valve, and an extending section that extends in a radial direction of the channel forming section further outward from an outer side of the annular projecting section and projection height thereof from the channel forming section is lower than the annular projecting section.

8. The pressure buffer device according to claim 7, further comprising an outer annular projecting section that is annularly formed as projecting in the axial direction toward the valve at the outer side of the extending section of the radial direction,
wherein the extending section is formed as extending to the outer annular projecting section.

9. The pressure buffer device according to claim 7, further comprising an outer annular projecting section that is annularly formed as projecting in the axial direction toward the valve at the outer side of the extending section of the radial direction,
wherein the extending section is formed as being apart from the outer annular projecting section.

10. The pressure buffer device according to claim 7, wherein the extending section includes a cutout section that is concaved in the axial direction as extending in a circumferential direction of the channel forming section.

11. A damping force generating member, comprising:
a channel forming section that forms a channel through which fluid flows in accordance with relative movement of a rod against a cylinder;
an annular projecting section that is annularly formed as projecting in an axial direction of the channel forming section;
an extending section that extends in a radial direction of the channel forming section from an outer side of the annular projecting section; and
an outer annular projecting section that is annularly formed as projecting in the axial direction at a radially outer side of the extending section, wherein
an outermost end of the extending section in the radial direction is provided at a radially inner side of an innermost portion of a channel opening of the channel, and
the extending section projects in the axial direction from the channel forming section.

* * * * *